US008056084B2

(12) United States Patent
Hughes et al.

(10) Patent No.: US 8,056,084 B2
(45) Date of Patent: Nov. 8, 2011

(54) METHOD AND SYSTEM FOR DYNAMICALLY REALLOCATING A RESOURCE AMONG OPERATING SYSTEMS WITHOUT REBOOTING OF THE COMPUTER SYSTEM

(75) Inventors: Nathan Jared Hughes, Fort Collins, CO (US); Stephen Patrick Hack, Fort Collins, CO (US); Michael S. Allison, Fort Collins, CO (US); John A. Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1319 days.

(21) Appl. No.: 11/626,957

(22) Filed: Jan. 25, 2007

(65) Prior Publication Data

US 2008/0184247 A1    Jul. 31, 2008

(51) Int. Cl.
*G06F 9/46* (2006.01)
(52) U.S. Cl. ........................................ 718/104
(58) Field of Classification Search ............ 718/104
See application file for complete search history.

(56) References Cited

U.S. PATENT DOCUMENTS

| | | | |
|---|---|---|---|
| 6,326,973 | B1 | 12/2001 | Behrbaum et al. |
| 6,462,745 | B1 | 10/2002 | Behrbaum et al. |
| 2002/0016891 | A1 | 2/2002 | Noel et al. |
| 2002/0016892 | A1 | 2/2002 | Zalewski et al. |
| 2002/0032850 | A1 | 3/2002 | Kauffman |
| 2002/0052914 | A1 | 5/2002 | Zalewski et al. |
| 2004/0187106 | A1* | 9/2004 | Tanaka et al. ............ 718/1 |
| 2005/0144536 | A1 | 6/2005 | Wei |
| 2005/0160151 | A1 | 7/2005 | Rawson |
| 2005/0182922 | A1 | 8/2005 | Guo et al. |
| 2005/0198632 | A1* | 9/2005 | Lantz et al. ................. 718/1 |
| 2006/0010450 | A1* | 1/2006 | Culter ....................... 718/104 |
| 2006/0136761 | A1 | 6/2006 | Frasier et al. |
| 2006/0184938 | A1* | 8/2006 | Mangold .................... 718/1 |

OTHER PUBLICATIONS

Poniatowski, Marty, HP Virtual Partitions, Apr. 5, 2002, http://www.informit.com/articles/printerfriendly.asp? p=26241&rl=1, pp. 1-33.
Hewlett-Packard Corporation, Intel Corporation, Microsoft Corporation, Phoenix Technologies Ltd., and Toshiba Corporation. Advanced Configuration and Power Interface Specification. Revision 3.0b, Oct. 10, 2006, pp. 1-631.

* cited by examiner

*Primary Examiner* — Meng An
*Assistant Examiner* — Blake Kumabe

(57) ABSTRACT

A method of allocating a resource in a computer system having a plurality of operating systems, and related system, are disclosed. In at least one embodiment, the method includes providing an advanced configuration and power interface (ACPI) operating to facilitate interactions between at least one of the plurality of the operating systems and one or more of the resource, a hardware device, and firmware, and determining whether the resource is allocated to a first of the plurality of operating systems. The method further includes ejecting the resource from the first operating system, and allocating the resource to a second of the plurality of operating systems.

16 Claims, 2 Drawing Sheets

METHOD AND SYSTEM FOR DYNAMICALLY REALLOCATING A RESOURCE AMONG OPERATING SYSTEMS WITHOUT REBOOTING OF THE COMPUTER SYSTEM

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to computer systems and, more particularly, relates to methods of adding, moving, and/or otherwise assigning and reassigning one or more computer resources within the computer systems.

BACKGROUND OF THE INVENTION

Many modern computer systems simultaneously perform a variety of processes, each of which may have particular needs for available resources of the computer systems. For example, many modern computer systems simultaneously run multiple operating systems, each of which may have particular needs for available resources. At least some such computer systems employ interfaces termed advanced configuration and power interfaces (ACPIs) that allow for multiple operating systems to interface the hardware (and/or firmware) of the computer systems. Also for example, modern computer systems typically run multiple applications simultaneously, where each of the applications may have particular needs for available resources.

There are many different resources of computer systems that can potentially be allocated to different processes having needs for those resources. For example, most computer systems have multiple memory devices, ranging from cache memory to main memory devices including random access memory (RAM) devices (e.g., dynamic RAM or static RAM devices) as well as other types of memory such as read only memory (ROM) devices or external memory devices. In some computer systems, not only specific devices but also memory portions or locations within the various hardware devices also potentially are divisible and potentially allocable. Also for example, most computer systems have one or more processing devices (e.g., central processing units (CPUs) such as microprocessors), and the processing power of these devices can allocated to different processes.

Often the allocation of resources to the multiple processes of such conventional computer systems is rigidly fixed, either permanently when the computer systems are built or at least whenever the computer system are turned on or rebooted. Yet this rigid allocation of resources can be undesirable, since the needs of the processes can change over time during their operation, such that an allocation of resources that may be appropriate and represent an efficient usage of those resources at a given time may no longer be appropriate and efficient at a later time.

For at least these reasons, it would be advantageous if an improved method and system for resource allocation could be developed by which one or more resources available to a computer system were not so rigidly fixed in terms of their allocation to the different processes of the computer system as is the case with conventional computer systems.

BRIEF SUMMARY OF THE INVENTION

The present invention in at least some embodiments relates to a method of allocating a resource in a computer system having a plurality of operating systems. The method includes providing an advanced configuration and power interface (ACPI) operating to facilitate interactions between at least one of the plurality of operating systems and one or more of the resource, a hardware device, and firmware. The method also includes determining whether the resource is allocated to a first of the plurality of operating systems. The method further includes ejecting the resource from the first operating system; and allocating the resource to a second of the plurality of operating systems.

Additionally, in at least some embodiments, the present invention relates to a system allowing for allocating resources to a plurality of operating systems. The system includes a plurality of hardware devices, and firmware supported by the plurality of hardware devices. The system additionally includes an advanced configuration and power interface (ACPI), where the ACPI facilitates interactions between the hardware devices and the plurality of operating systems at least partly by way of the firmware. The ACPI is capable of receiving a plurality of commands from the operating systems and, in response to the commands, capable of reallocating at least one of the resources from a first of the operating systems to a second of the operating systems.

Further, in at least some embodiments, the present invention relates to a method of dynamically reallocating at least one resource among operating systems of a computer system. The method includes determining whether the at least one resource is currently allocated to at least one of the operating systems, and causing the at least one resource to no longer be allocated to the at least one operating system when it is determined that the at least one resource is currently allocated to the at least one operating system. The method additionally includes allocating the at least one resource to one or more operating systems other than the at least one operating system, where the method achieves the reallocating of the at least one resource without rebooting of the computer system.

DETAILED DESCRIPTION OF THE PREFERRED EMBODIMENT

Figure 1:
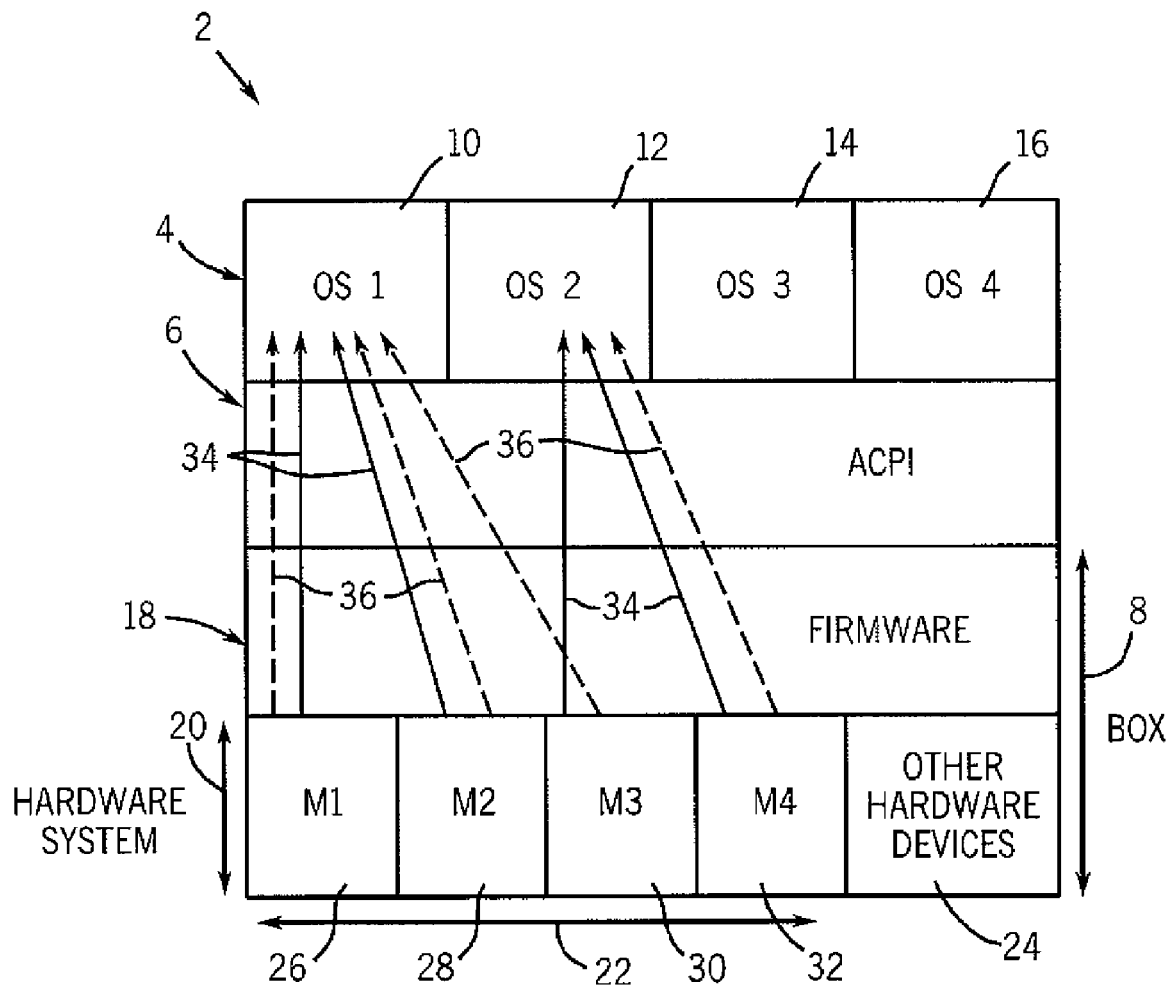
FIG. 1 shows in schematic form components of a computer system in accordance with one exemplary embodiment of the present invention.

Referring to FIG. 1, components of an exemplary computer system 2 in a simplified, schematic form are shown. As shown, the computer system 2 in the present embodiment includes multiple operating systems (OSs) 4, an advanced configuration and power interface (ACPI) 6 and a box 8. More particularly, in the present embodiment, the multiple OSs 4 include four different operating systems (or instances of the same operating system), which are shown as first, second, third and fourth operating systems 10, 12, 14 and 16 respectively. Each of the OSs 10, 12, 14 and 16 includes executable code to perform various tasks including, for example, file management, networking and resource allocation tasks, as well as tasks relating to management of other software and hardware resources of the computer system 2. The OSs 10-16 are capable of supporting a wide variety of applications (not shown).

The multiple OSs 4 are intended to be representative of any of a variety of types of operating systems as adapted in accordance with various embodiments of the present invention. In the present embodiment, the multiple OSs 4 are HP-UX OSs as are available from the Hewlett-Packard Company of Palo Alto, Calif. However, in other embodiments, one or more of the OSs 10, 12, 14 and 16 can take any of a variety of other forms including, for example, OpenVMS, Disk Operating System (DOS), UNIX or LINUX OSs. In alternate embodiments, one or more of the OSs 4 can be another type of OS other than those mentioned above. Additionally, while the multiple OSs 4 of FIG. 1 in particular include four OSs 10, 12, 14 and 16, this number can vary in other embodiments from that shown, for example, to include either one, two or three OSs or possibly more than four OSs as well.

With respect to the ACPI 6, this is intended to be representative of an interface capable of facilitating communications between the multiple OSs 4 and the box 8. In the present embodiment, the ACPI 6 is an open industry standard interface set forth in the "ADVANCED CONFIGURATION AND POWER INTERFACE SPECIFICATION", Revision 3.0b (Oct. 10, 2006), which can be found at http://www.acpi.info/spec.htm, which is hereby incorporated by reference herein. The ACPI 6 of the present embodiment can be considered to be an improvement over BIOS based Advanced Power Management. More particularly, the ACPI 6, operating in conjunction with the OSs 10, 12, 14 and 16, can be used to perform a variety of functions including, for example, motherboard configuration, power management and resource addition for any resource/device of the computer system 2.

Further referring to FIG. 1, the box 8 includes firmware 18 and a hardware system 20. The firmware 18 is software that is closely tied to operation of the hardware system 20, and can serve several purposes. For example, the firmware 18 often is used during the initialization of the computer system 2, to verify the configuration of the computer system 2 or otherwise. Also, the firmware 18 serves as an interface (at least indirectly, via the ACPI 6) between the hardware system 20 and the OSs 4 at all times (in some embodiments, there are also direct interfaces other than ACPI that enable the OSs to interface with the firmware). The firmware 18 can take a variety of different forms depending upon the embodiment of the invention. For example, the firmware 18 can be embedded on read-only memory (ROM) devices such as flash memory devices, programmable ROM (PROM) devices, electrically erasable PROM (EEPROM) or any other medium that is available and used other than those already mentioned above.

The hardware system 20 of the present embodiment includes a memory 22 as well as other hardware devices 24. The memory 22 can take a variety of forms depending upon the embodiment. In one embodiment of the present invention, the memory 22 includes a main memory formed from conventional random access memory (RAM) devices such as dynamic random access memory (DRAM) devices. In alternate embodiments, the memory 22 can be formed from other types of memory devices, such as memory provided on floppy disk drives, tapes and hard disk drives or other storage devices that can be coupled to the computer system 2 of FIG. 1 either directly or indirectly (e.g., by way of a wired or wireless network). In further embodiments, the memory 22 can be formed from static random access memory (SRAM) devices such as cache memory, either as a single level cache memory or as a multilevel cache memory having a cache hierarchy. In still other embodiments, the memory 22 can include any combination of one or more of the above-mentioned types of memory devices, and/or other devices as well. The memory 22 can store all or part of the firmware 18.

In the present embodiment, the memory 22 is divided into smaller segments or chunks, shown as first, second, third and fourth memory segments 26, 28, 30 and 32, respectively in FIG. 1. In the present embodiment, each of the memory segments 26, 28, 30 and 32 can be assigned/allocated to any one of the different OSs 10, 12, 14 and 16. Further, although in the present embodiment the memory 22 is divided into four segments, the number of memory segments can vary in other embodiments, for example, to include either one, two, or three memory segments or possibly more than four memory segments. Notwithstanding the fact that in the present exemplary embodiment there are both four OSs and four memory segments, the number of memory segments need not be the same as the number of OSs.

As will be described in further detail below, embodiments of the present invention in particular allow for dynamic reallocation of hardware resources such as the memory segments 26, 28, 30 and 32. FIG. 1 in particular shows two exemplary allocations of the memory segments 26, 28, 30 and 32 that are possible at different times. A first of these two allocations, represented by first arrows 34, involves allocating the memory segments 26 and 28 to the OS 10 and allocating the memory segments 30 and 32 to the OS 12. A second of these two allocations, represented by second arrows 36, involves allocating the memory segments 26, 28 and 30 to the OS 10 while the memory segment 32 is allocated to the OS 12.

As for the other hardware devices 24 of the hardware system 20, these are intended to include any of a variety of other types of hardware devices other than the memory 22 that can be present in the computer system 2. The other hardware devices 24 can include, for example, one or more processing devices (e.g., microprocessors, programmable logic devices, etc.) serving as one or more central processing units (CPUs) of the computer system 2. Additionally, the other hardware devices 24 can also include, for example, one or more input devices such as a keyboard, a computer mouse, a joystick or any other device used to enter information into the computer system 2, one or more output devices such as a monitor, a touch-screen, a printer, a projector or any other device used to present information from the computer system to the user or to otherwise output information, and/or any other hardware device that can be directly or indirectly coupled to the computer system 2 (including, for example, one or more devices for interfacing/connecting to one or more wired or wireless networks).

The other hardware devices 24 are not shown to be segmented or allocated in any particular manner in FIG. 1. Nevertheless, it should be understood that, as with respect to the memory 22, all of the other hardware devices 24 of the computer system 2 in the present embodiment also can be divided/allocated/assigned to the different OSs 10, 12, 14 and 16. For example, the processing capabilities associated with one or more processing devices of the other hardware devices can be divided/allocated/assigned to the different OSs 10-16 in a variety of manners. Again, as further described below, in accordance with embodiments of the present invention, these other hardware devices 24 (like the memory 22) can also be dynamically reallocated among the different OSs 10, 12, 14 and 16.

In at least some embodiments of the present invention, including the present embodiment of the invention, the computer system 2 is operated to form a virtual partitioning environment having virtual partitions. For example, the computer system 2 can be operated in accordance with the vPars (Virtual Partitions) product available from the aforementioned Hewlett-Packard Company to achieve such a virtual partitioning environment. When organized so as to form such an environment, the virtual partitions of the computer system 2 can be effectively operated as multiple "virtual" computers within the single computer system.

In such embodiment, each virtual partition is managed individually by one of the OSs 10, 12, 14 or 16 and is eligible to share (and typically does share) the hardware resources of the computer system. Use of the vPars product in particular allows one to run multiple instances of HP-UX simultaneously on one hard partition by dividing the hard partition further into virtual partitions. Each separate HP-UX OS instance is capable of hosting its own set of applications. Each HP-UX OS instance also can be of a different release, have different patches, and have a different kernel. Because each HP-UX OS instance is isolated from all other instances, use of the vPars product provides application and OS fault isolation.

Potentially all of the different hardware resources of the computer system 2, including the memory 22 as well as the other hardware devices 24 (and any other hardware resources) are allocated to specific virtual partitions managed by specific operating systems. The different virtual partitions are isolated from each other at the software application level. Applications running on one virtual partition will not affect software running on another virtual partition.

As already described above, the memory segments 26, 28, 30 and 32 are allocated to various ones of the OSs 10, 12, 14 and 16 and thus allocated to various virtual partitions. Likewise the other hardware devices 24 can be divided up and allocated among the various partitions managed by the various OSs 10, 12, 14 and 16. Although some hardware resources can be unused at certain times, such unallocated resources will still be visible to the different virtual partitions. It should be understood that, while often each virtual partition will be allocated at least some of the resources (e.g., each virtual partition will have at least one segment of the memory 22 allocated to it), this need not be the case (e.g., as described above, in the present example the memory segments 26, 28, 30 and 32 are allocated only to the OSs 10 and 12).

Figure 2:
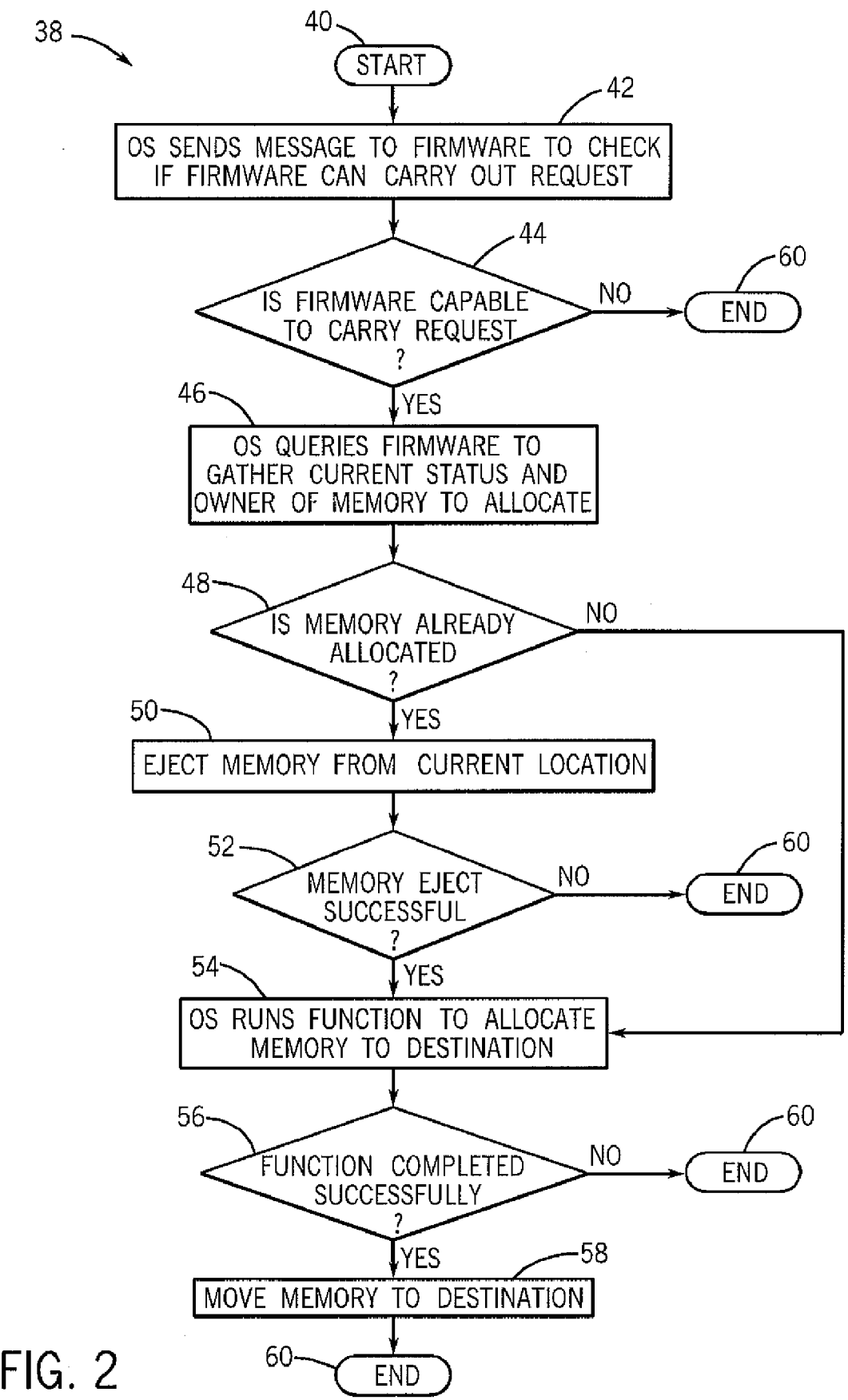
FIG. 2 is a flow chart showing exemplary steps of operation, which in particular relate to the addition of resources to an operating system of the computer system of FIG. 1 in accordance with one embodiment of the present invention.

Turning to FIG. 2, at least some embodiments of the present invention relate to processes, such as an exemplary process 38, in which ACPI methods are used to allocate/reallocate (e.g., add, remove, assign, reassign, or otherwise transfer/migrate) resources of the computer system 2 to and from the different OSs 10, 12, 14 and 16 of the computer system, that is, to vary the allocation of resources among the different virtual partitions governed by those OSs. Unallocated resources in the computer system 2 which are visible to the different OSs/virtual partitions can also be allocated or added using the ACPI methods. Generally speaking, to accomplish allocation/reallocation, the OS of a virtual partition instance that desires a particular resource typically calls the firmware 18 to synchronize the ownership of that resource vis-à-vis the other OSs/virtual partitions. In contrast to conventional methods of resource allocation, rebooting of the computer system 2 is not required to enable the resources to be allocated/reallocated. Rather, in accordance with these embodiments of the present invention, resource allocation/reallocation can be performed dynamically during operation of the computer system 2.

As already noted above, depending upon the embodiment, any one or more of the hardware resources of the computer system 2, including the memory 22 and/or any of the other hardware devices 24, can be allocated/reallocated. Nevertheless, as an example, the flow chart 38 shows process steps that can be performed to cause a reallocation of a memory segment in relation to OSs (and the virtual partitions managed by those OSs) of the computer system 2. As one example, the flow chart 38 can be understood to encompass process steps that are performed to cause a reallocation of the third memory segment 30 from the OS 12 to the OS 10, as is illustrated by FIG. 1 (insofar as the third memory segment is shown to be linked to the second OS 12 by one of the first arrows 34 and also shown to be subsequently linked to the first OS 10 by one of the second arrows 36).

As shown in FIG. 2, upon starting at a step 40, the memory segment(s) of the computer system 2 are allocated (or unallocated) in a particular initial manner. For example, as shown in FIG. 1, the third memory segment 30 can be initially assigned to/owned by the second OS 12 (e.g., by the virtual partition affiliated with that OS). Next at a step 42, another of the OSs (in the present example, the first OS 10) determines that it desires reallocation of the third memory segment 30 to itself. Thus, the OS 10 invokes the ACPI 6 to commence such a reallocation. The ACPI 6 facilitates the reallocation by means of a Device Specific Method (DSM), which provides device specific control functions to devices in the computer system 2 and is executed in response to a _DSM function call. For example, the _DSM method can be used to allocate a memory resource to any of the various OSs 10, 12, 14 and 16 in the computer system 2.

More particularly, the DSM method, which can be used to perform resource allocation/reallocation for any device in the computer system 2, is performed based upon four arguments, namely, a UUID (Universal Unique Identifier), a Revision ID, a Function Index and Arguments. The UUID is a 128 bit buffer that differentiates the various functions that can be performed on a device in the computer system 2 using the _DSM function call. The Revision ID is unique to the UUID and provides a revision for a function. The Function Index is a number, the meaning of which is unique to the UUID and the Revision ID. When the Function Index is equal to 0, this is indicative of a special query function that returns a buffer specifying all the different function indices that are supported by the computer system 2 for a specified UUID and Revision ID. When the Function Index takes on a non-zero value, is function-specific depending upon the UUID and Revision ID. The DSM method can be placed at any device level that is visible to the OS so that resources currently not visible to the OS can also be added.

In the present example in which the OS 10 desires the memory segment 30, the OS 10 attempts to determine if the firmware 18 is capable of performing the migration of the memory segment 30 by calling the _DSM function at the step 42. The _DSM function in this example can have a special Function Index of 0. Then, based upon a value returned by the firmware 18 in response to the _DSM function, the OS 10 is able to determine in a step 44 if the firmware 18 is capable of performing the desired memory migration.

If the value returned by the _DSM function call in the step 44 is 0, this indicates that the firmware 18 is not capable of performing the desired memory migration (e.g., because the firmware is an earlier version of firmware not having such capability) and consequently the process ends at a step 60. However, if the Function Index value returned by the DSM function call in step 44 is 1, then this indicates that the firmware 18 is capable of the functionality appropriate for reallocating the memory segment 30, and so the process proceeds to a step 46.

Upon reaching the step 46, the OS queries the firmware 18 again by making another function call. At this time, the purpose of querying the firmware 18 is to obtain information regarding the current status and location of the resource that is of particular interest to the OS, e.g., the memory segment 30 that is of particular interest to the OS 10. In the present example, two distinct function calls are made by the OS to obtain the status and ownership information, namely, a _STA method for obtaining the status information and a _FPN method for obtaining ownership information. Both of these methods, which are described in more detail below, are used to identify the status/ownership information of the memory segment 30 to be migrated from the OS 12 to the OS 10. Notwithstanding the use of the _STA and _FPN methods in the present example, in alternate embodiments one or more ACPI_DSM function calls can be employed instead to obtain this information.

Further with respect to the present exemplary embodiment, every resource in the computer system 2 has a status (STA) method to determine the status and a F-Pars Number (FPN) method to determine the ownership of the resource in the computer system 2. Knowledge of the current ownership of a resource is significant since, in the present embodiment, an OS can only delete a resource that it owns. The firmware 18 will communicate the ownership of the memory segment 30 via the FPN method, which also is an ACPI method and is executed in response to a _FPN function call. The FPN method maintains the ownership of the resource in terms of the OS, which manages the resource and the virtual partition to which the resource belongs. The return value of the _FPN function call conveys the current owner of the memory segment (e.g., the memory segment) 30 to the OS (e.g., the OS 10).

As for the STA method, this method is another ACPI method that determines the status of a resource in the computer system 2, and that is executed in response to the calling of a _STA function. In the present embodiment, the _STA function call is 32 bits long and does not take any arguments like the DSM method. The different bits of the function call reflect the status of a device in the computer system 2.

More particularly, the status of a device can be one of the following: enabled, disabled or removed. A bit 0 of the _STA method function call, which represents the right-most or the least significant bit (LSB), is set if a given device is present in the computer system 2. A bit 1 is set if the device is enabled and decoding its hardware resources. If the bit 0 is cleared, then the bit 1 should also be cleared since a device which is not present in the computer system 2 cannot be enabled. Additionally, a bit 2 of the STA method function call is set if the device should be shown in the user interface (not shown) associated with the computer system 2. Further, a bit 3 is set if the device is functioning properly and a bit 4 is set if the device has a battery. Bits 5-31 are reserved bits which typically should be cleared. A set bit represents a logic level 1 in digital electronics, while a cleared bit represents a logic level 0.

The different bits of the STA method/function call are updated after every function call to reflect the outcome of the function call in the computer system 2. The STA method can be called at any point of time during the allocation/reallocation of a resource to determine the current status of the resource. By looking at the return values of the _STA and _FPN function calls executed in response to the DSM method in the step 46, the OS 10 determines the status and owner of the memory segment 30.

In the embodiment of FIG. 1, the devices in the computer system 2 are arranged in a tree structure maintained by the firmware 18. The various devices in the tree structure, including the devices that may or may not be currently assigned to a virtual partition (hence, may or may not be managed by the various OSs 10-16) are visible to the various OSs 10, 12, 14 and 16, by means of those OSs requesting the tree structure from the firmware 18 and further traversing the tree in the computer system 2. By traversing the tree, the OS 10 can also determine the location of the memory segment 30 in the tree hierarchy.

Upon determining the owner, status and location of the memory segment 30 at the step 46, the process moves to a step 48 at which the OS 10 determines whether the memory resource of interest has already been allocated to an OS/virtual partition or not, based upon the response of the FPN and STA methods executed in the step 46. In the present example of FIG. 1 in which the OS 10 desires the memory segment 30, the OS 10 determines that the memory segment 30 has been initially assigned to the second OS 12, and so the response to the _DSM ACPI method would be an indication that the memory segment 30 is currently owned by the OS 12. However, in other circumstances, the memory segment 30 (or other memory segment or other resource) can be assigned to other virtual partitions/OSs, or even be an unused resource that, although not owned by any OS, is still visible to all of the OSs and capable of being added to any OS/virtual partition in the computer system 2.

If at the step 48 the OS (e.g., the OS 10) determines that the desired memory resource (e.g., the memory segment 30) is not already allocated, then the process proceeds to a step 54, which is described in further detail below. However, if at the step 48 the OS determines that the desired memory resource is already allocated, then the process advances to a step 50, at which a memory ejection operation is performed in relation to the desired memory resource by the operating system currently having ownership of the desired memory resource (otherwise, if the OS desiring the memory resource proceeded to request allocation of the resource to itself, that request would be rejected). (Also, if the operating system currently having ownership may not eject the memory resource, then the request would also be rejected.) In the example of FIG. 1, the memory segment 30 is initially assigned to the second OS 12 and yet the first OS 10 desires reassignment of that memory segment to itself. For that reason, in the present example, the process of FIG. 2 proceeds from the step 48 to the step 50 to accomplish the freeing-up of the desired memory segment 30.

More particularly, to perform a memory delete operation, an ACPI eject method is executed at the step 50 by means of a _EJx function call (where the "x" in _EJx represents the different sleeping states supported by a resource and can range from 0-4). The eject method allows for the dynamic removal or ejection of a resource from the OS currently having ownership of the resource by making a _EJ0 function call. In the present example, the OS 12 (currently owning the memory segment 30) makes the _EJ0 function call at the step 50 to attempt to de-allocate the desired memory segment 30 before the OS 10 can allocate the memory segment 30 to itself.

Although devices are most commonly ejected by means of the _EJ0 function call, other eject function calls, for example, _EJ1, _EJ2, _EJ3 or _EJ4 can also be used to facilitate the removal of a resource from the OS managing the resource. Further, while all resources in the computer system 2 support the eject method, in other embodiments not every resource can be ejected. In such embodiments, whether a given resource can be ejected is determined by the firmware 18, which only executes the _EJx function call on resources that can be ejected. Also, in some alternate embodiments, when it is determined that a memory segment desired by an OS is already allocated, rather than ejecting that memory segment, the OS instead can traverse the tree structure and query the various memory segments which are part of the tree to find a memory segment that is able to be allocated to the OS.

Assuming that a memory resource of interest (e.g., the memory segment 30) can be ejected, the firmware 18 will execute the eject method on that memory resource by calling the _EJ0 function and consequently proceed to a step 52 where the outcome of the _EJ0 function call/method is determined. More particularly, at the step 52, a _STA function call is executed in response to the execution of the _EJ0 function call, and the different bits of the _STA function call determine if the memory was successfully ejected. In the present example in which the memory segment 30 is desired by the OS 10, a bit 1 of the _STA method for that memory segment (which was set before the _EJ0 function call to reflect ownership by the OS 12) will be cleared if the _EJ0 function call successfully completed ejection, indicating that the memory segment 30 is no longer owned by the OS 12.

If it is determined at the step 52 that the _EJ0 method of the step 50 failed to eject the memory resource of interest (e.g., the memory segment 30), then the bit 1 will remain set, indicating that the original ownership allocation of that memory resource (e.g., to the OS 12) remains intact and that the memory resource cannot be ejected or migrated. If this occurs, then the process of the flow chart 38 progresses to a step 60, at which point the process ends (albeit, in some alternate embodiments, the process could then repeat the step 50 on one more occasions to reattempt ejection). However, if at the step 52 it is determined that the _EJ0 method completed successfully, the ejected memory resource (e.g., the segment 30) can then be allocated to the OS desiring that resource (e.g., the OS 10), and so the process advances to the step 54.

As discussed above, the process of the flow chart 38 is capable of attaining the step 54 either because the desired memory resource was successfully ejected as determined in the step 52 or because the desired memory resource was determined at the step 48 as being currently not allocated. In either case, if the process reaches the step 54, it is because the resource that is desired (e.g., the memory segment 30) is free for allocation to the desirer (e.g., the OS 10). Upon reaching the step 54, the OS desiring the memory resource then calls another DSM ACPI method (more particularly, a _DSM function call) that is intended to cause the allocation/migration of the desired memory resource to that OS. With respect to the example of FIG. 1 in which the OS 10 desires the memory segment 30, therefore, the _DSM function call of the step 54 allows the OS 10 to request the ownership of the memory segment 30 to be transferred to itself.

The ACPI methods cannot be called on devices that are not owned by any OSs (e.g., devices that are ejected are not owned by any of the various OSs 10, 12, 14 and 16), the ownership being determined by the FPN and STA methods. Nevertheless, as mentioned above, all of the devices/resources in the computer system 2 are arranged in a tree structure which is visible to the OSs, where the root of the tree is _SB_. In the present embodiment, this tree structure is utilized to facilitate the allocation or reallocation of resources that are part of the tree structure but are not currently owned by any of the various OSs, e.g., memory resources that have been ejected. More particularly, the _DSM function call executed in the step 54 is usually executed from the root (_SB_) of the tree rather than from individual devices. Notwithstanding that this is usually the case, the ACPI DSM method can also be called for individual devices in the tree as long as a parent resource of the device (for which the DSM method is called) in the tree has a DSM function available. For example, in the present embodiment, the _DSM method is placed at _SB_ to be able to add any memory segment in the computer system 2. In alternate embodiments, the _DSM method can be put at a different level to allocate devices as long as it is at a level above the resources that are desired to be allocated. This enables the OS to allocate resources not currently allocated to the OS which otherwise would not be possible under ACPI.

In general, the various ACPI methods of the step 54 and the other above-discussed steps are executed in the OSs using ACPI Machine Language (AML), which is the language that the ACPI interpreter understands. However, in at least some embodiments, the ACPI_DSM function call of the step 54, in addition to causing migration of a memory resource such as the memory segment 30, also moves the code for performing the addition into the firmware 18 via an A1 OpRegion that is capable of running ACPI Machine Language (AML) without calling any of the OSs. The A1 OpRegion serves as a link or hook in AML and ACPI to enable calling of non-AML code from within an ACPI function. This allows for the execution of normal firmware code (non-AML) to perform the addition of the memory segment 30.

Upon performing the step 54 intended to cause the reallocation of a memory resource (e.g., the memory segment 30) to the OS desiring that memory resource (e.g., the first OS 10), at a step 56 it is then determined whether the reallocation was successfully completed. More particularly, the status of the migration of the memory resource to the virtual partition managed by the OS desiring that memory resource is determined by a return value of the _DSM ACPI method called in step 54. If at the step 56 it is determined that the migration was unsuccessful, then the process ends by progressing to the step 60 of the flowchart 38. However, if it is determined that the allocation of the memory resource to the virtual partition managed by the OS desiring that memory resource has in fact been successful, then the process proceeds to a step 58.

Assuming that the allocation of the memory resource has been successfully achieved in the step 56, this is not to say that the process of migrating the memory resource has in fact been completed. Rather, subsequent to the performance of the step 56, the internal states of the STA and FPN methods are updated in step 58 to reflect the new assignment of the memory resource to the appropriate OS/virtual partition. Thus, in the present example in which the memory segment 30 has been moved from the OS 12 to the OS 10, at the step 58 the internal states of the STA and FPN methods are updated to reflect this transition. Upon completion of the step 58, the process advances again to the step 60, at which the process is completed.

While the process described above with respect to the flow chart 38 of FIG. 2 is one example of a process by which memory resources can be allocated/reallocated among the OSs/virtual partitions of a computer system in a dynamic manner, the present invention is also intended to encompass a variety of other processes, including modifications and/or refinements of the above-described process, allowing for resource allocation/reallocation. The particular ACPI methods employed above to facilitate resource addition and deletion, the steps followed to facilitate resource addition for a device in the computer system and other features could all be varied depending upon the type/needs of the computer system being used and the device being added.

Also, as already noted above, the present invention is intended to encompass processes in which not merely memory but also other hardware resources (and even firmware, or other resources) are moved among virtual partitions managed by different OSs (or possibly other processes). In alternate embodiments, resource addition, allocation, and/or reallocation in accordance with embodiments of the present invention can be performed in environments other than a virtual partition environment, both where unused resources are added to an OS as well as where resources are moved between different OSs.

It is specifically intended that the present invention not be limited to the embodiments and illustrations presented herein, but include modified forms of those embodiments including combinations of elements of different embodiments or portions of the embodiments that come within the scope of the following claims.

We claim:

1. A process of allocating a resource in a computer system having a plurality of operating systems, the process comprising:
   providing an advanced configuration and power interface (ACPI) operating to facilitate interactions between at least a first and second of the plurality of operating systems and one or more of the resource, a hardware device, and firmware;
   determining whether the resource is allocated to the first operating system;
   if the resource is determined to be allocated to the first operating system, ejecting the resource from the first operating system, wherein the determining and ejecting occur in response to respective calls of first and second ACPI methods, and wherein the second ACPI method to perform the ejecting is called by the first operating system, and the first ACPI method to perform the determining is called by the second operating system; and
   after the ejecting, allocating, in response to a third ACPI method called by the second operating system, the resource to the second operating system, wherein the ejecting and allocating of the resource constitute a reallocation of the resource from the first operating system to the second operating system.

2. The process of claim 1, further comprising:
   requesting information concerning at least one of a status, an owner and a location of the resource.

3. The process of claim 1, further comprising:
   determining whether the firmware of the computer system is capable of carrying out a requested operation to determine at least one of status information concerning the resource and ownership information of the resource.

4. The process of claim 1, wherein the interactions facilitated by the ACPI occur between at least one of the first or the second operating systems and either the resource or the hardware device by way of the firmware.

5. The process of claim 1, wherein each of the respective operating systems manages a respective one of plural virtual partitions of the computer system.

6. The process of claim 1, wherein the resource includes or is supported by the hardware device, and wherein the resource includes one or more of (i) a memory segment; (ii) a processing capability; and (iii) an input/output capability.

7. The process of claim 1, wherein the resource includes a memory segment, and wherein the memory segment is selected from the group consisting of cache memory, main memory, and random access memory (RAM).

8. The process of claim 1, wherein the determining, the ejecting and the allocating all occur dynamically during normal operation of the computer system subsequent to a booting up of the computer system.

9. A system comprising:
   a plurality of operating systems;
   a plurality of hardware resources;
   firmware supported by the plurality of hardware resources; and
   an advanced configuration and power interface (ACPI) including ACPI methods, wherein the ACPI facilitates interactions between the hardware resources and the plurality of the operating systems at least partly by way of the firmware,
   wherein the ACPI methods upon execution cause:
      deallocation of a particular one of the hardware resources from a first of the operating systems, and
      allocation of the deallocated particular hardware resource to a second of the operating systems, wherein the allocation of the particular hardware resource is to be performed in response to calling of a first one of the ACPI methods by the second operating system, wherein at least some of the hardware resources including the particular hardware resource are arranged in a tree structure that is visible to the operating systems, wherein the tree structure includes a given level above a level of the particular hardware resource, and wherein the given level is associated with the first ACPI method that enables the first ACPI method to be called by the second operating system to perform the allocation, even though the second operating system does not yet own the particular hardware resource.

10. The system of claim 9, wherein the plurality of operating systems are to respectively manage a plurality of virtual partitions.

11. The system of claim 9, wherein the hardware resources include at least one selected from the group consisting of storage devices and processing devices.

12. The system of claim 9, wherein the ACPI methods are selected from among:
   a device specific method (DSM), a status (STA) method, a F-Pars Number (FPN) method, and an eject (_EJx) method.

13. The system of claim 9, wherein the deallocation of the particular hardware resource from the first operating system is to be performed in response to calling of a second one of the ACPI methods by the first operating system to eject the particular hardware resource.

14. A process of dynamically reallocating at least one resource among operating systems of a computer system, the method comprising:
   determining whether the at least one resource is currently allocated to a first one of the operating systems;
   causing the at least one resource to no longer be allocated to the first operating system when it is determined that the at least one resource is currently allocated to the first operating system; and
   after causing the at least one resource to no longer be allocated to the first operating system, allocating the at least one resource to a second one of the operating systems other than the first operating system, wherein the allocating is performed in response to the second operating system calling an advanced configuration and power interface (ACPI) method,
   wherein the process achieves the reallocating of the at least one resource without rebooting of the computer system, wherein the at least one resource is part of a tree structure of resources, the tree structure having a given level above a level of the at least one resource, and wherein the given level is associated with the ACPI method that enables the ACPI method to be called by the second operating system to perform the allocating, even though the second operating system does not yet own the at least one resource.

15. The process of claim 14, wherein each of the determining and the causing occurs in response to calling a respective one of further ACPI methods.

16. A process of allocating a resource in a computer system having a plurality of operating systems, the process comprising:

providing an advanced configuration and power interface (ACPI) operating to facilitate interactions between at least a first and second of the plurality of operating systems and one or more of the resource, a hardware device, and firmware;

determining whether the resource is allocated to the first operating system;

if the resource is determined to be allocated to the first operating system, ejecting the resource from the first operating system; and after the ejecting, allocating, in response to a first ACPI method called by the second operating system, the resource to the second operating system, wherein the resource to be allocated is part of a tree structure of resources, the tree structure having a given level above a level of the resource to be allocated, wherein the given level is associated with the first ACPI method that enables the first ACPI method to be called by the second operating system to perform the allocating, even though the second operating system does not yet own the resource to be allocated.

\* \* \* \* \*